(12) United States Patent
Hall

(10) Patent No.: US 7,433,027 B2
(45) Date of Patent: Oct. 7, 2008

(54) APPARATUS AND METHOD FOR DETECTING LENS THICKNESS

(75) Inventor: William Jordan Hall, Atlanta, GA (US)

(73) Assignee: Novartis AG, Basel (CH)

( * ) Notice: Subject to any disclaimer, the term of this patent is extended or adjusted under 35 U.S.C. 154(b) by 217 days.

(21) Appl. No.: 11/305,061

(22) Filed: Dec. 16, 2005

(65) Prior Publication Data

US 2006/0132761 A1 Jun. 22, 2006

Related U.S. Application Data

(60) Provisional application No. 60/638,635, filed on Dec. 22, 2004.

(51) Int. Cl.
*G01B 9/00* (2006.01)
*G01B 11/24* (2006.01)
*G01B 11/06* (2006.01)

(52) U.S. Cl. .................. 356/124; 356/613; 356/632

(58) Field of Classification Search .............. 356/124, 356/126, 638, 601
See application file for complete search history.

(56) References Cited

U.S. PATENT DOCUMENTS

| 3,804,523 | A | * | 4/1974 | McCormack | 356/124 |
|---|---|---|---|---|---|
| 3,822,096 | A | * | 7/1974 | Wilms et al. | 356/391 |
| 3,874,798 | A | * | 4/1975 | Antonsson et al. | 356/638 |
| 3,901,606 | A | * | 8/1975 | Watanabe et al. | 356/638 |
| 3,917,391 | A | * | 11/1975 | Padula et al. | 353/80 |
| 3,947,129 | A | * | 3/1976 | Wiklund | 356/638 |
| 3,978,620 | A | * | 9/1976 | Feneberg et al. | 451/256 |
| 4,072,428 | A | * | 2/1978 | Moss | 356/244 |
| 4,210,038 | A | * | 7/1980 | Hill | 82/11 |
| 4,232,966 | A | * | 11/1980 | Schpak et al. | 356/244 |
| 4,289,400 | A | * | 9/1981 | Kubota et al. | 356/613 |
| 4,417,147 | A | * | 11/1983 | Faville | 250/559.14 |
| 4,469,646 | A | * | 9/1984 | Rawlings | 264/2.2 |
| 4,623,249 | A | * | 11/1986 | Grant | 356/124 |
| 4,647,261 | A | * | 3/1987 | Schaffner | 409/132 |
| 4,665,624 | A | * | 5/1987 | Wodis | 33/507 |
| 4,684,246 | A | * | 8/1987 | Downing et al. | 356/124 |
| 4,745,295 | A | * | 5/1988 | Seno et al. | 250/559.26 |
| 4,815,844 | A | * | 3/1989 | Schmalfuss et al. | 356/239.7 |
| 4,815,846 | A | * | 3/1989 | Wodis | 356/124 |
| 5,467,192 | A | * | 11/1995 | Manning | 356/613 |
| 5,500,732 | A | * | 3/1996 | Ebel et al. | 356/124 |
| 5,574,554 | A | * | 11/1996 | Su et al. | 356/124 |
| 5,604,583 | A | * | 2/1997 | Byron et al. | 356/124 |
| 5,708,501 | A | * | 1/1998 | Ikezawa et al. | 356/124 |
| 5,760,889 | A | * | 6/1998 | Manning | 356/124 |
| 5,930,734 | A | * | 7/1999 | Hofmann et al. | 702/97 |
| 6,047,082 | A | * | 4/2000 | Rhody et al. | 382/141 |
| 6,072,569 | A | * | 6/2000 | Bowen | 356/124 |
| 6,134,342 | A | * | 10/2000 | Doke et al. | 382/141 |
| 6,154,274 | A | * | 11/2000 | Davis et al. | 356/124 |

(Continued)

FOREIGN PATENT DOCUMENTS

JP 04-305144 10/1992

*Primary Examiner*—Gregory J Toatley, Jr.
*Assistant Examiner*—Bryan J Giglio
(74) *Attorney, Agent, or Firm*—Robert Ambrose

(57) ABSTRACT

The present invention relates to a non-contact/non-destructive method and apparatus for measuring the thickness of an ophthalmic lens. The present invention also provides a method for inspecting or measuring the base curve of a lens.

28 Claims, 9 Drawing Sheets

U.S. PATENT DOCUMENTS

| | | | |
|---|---|---|---|
| 6,700,671 B2 * | 3/2004 | Akishiba | 356/638 |
| 6,757,420 B2 * | 6/2004 | Krahn et al. | 382/142 |
| 6,765,661 B2 * | 7/2004 | Biel et al. | 356/124 |
| 6,788,399 B2 * | 9/2004 | Frumusa et al. | 356/124 |
| 6,937,328 B2 * | 8/2005 | Fukuma et al. | 356/128 |
| 2006/0109484 A1 * | 5/2006 | Akamatsu | 356/613 |

* cited by examiner

APPARATUS AND METHOD FOR DETECTING LENS THICKNESS

This application claims the benefit under 35 USC § 119 (e) of U.S. provisional application No. 60/638,635 filed Dec. 22, 2004, incorporated by reference in its entirety.

FIELD OF THE INVENTION

The present invention relates to a non-contact/non-destructive method and apparatus for measuring the thickness of an ophthalmic lens. The present invention also provides a method for inspecting or measuring the base curve of a lens.

BACKGROUND OF THE INVENTION

Most metrology systems designed to characterize the geometry of a lens are incomplete and/or destructive (or both). Currently, to find the thickness of a lens, the lens must be cut into one or more thin slices and measured under a microscope. Besides the obvious problem of destroying the lens, this process is extremely labor intensive and only results in capturing one or two "slices" through the lens. Currently, only 5-10 points can be measured per slice because of the time and skill required. Additionally, most types of contact lenses tend to exhibit shrinkage when removed from a hydrated environment, making measurement inaccurate.

Another method to measure lens thickness is to use a contact type touch probe. This method may be very slow and involves correcting for squash factors when the lens is compressed by the probe. Other methods that are capable of mapping the thickness of a lens over an entire surface are slow (approximately 1 sec. per point, with thousands of points per lens), and are also subject to the squash factor correction.

Additionally, current methods of measuring or inspecting the base curve of a lens are very difficult. Current methods include a 3-point circular fit of the base curve to characterize the base curve and fit performance of a lens.

The present invention seeks to correct the inadequacies of the prior art.

SUMMARY OF THE INVENTION

The present invention is directed to an apparatus and method for measuring the thickness of an ophthalmic lens. In one embodiment of the invention, the apparatus comprises an illumination source, an imaging system, a measurement chamber in optical connection with the illumination source and the imaging system, a rotating fixture connected to the measurement chamber via an adapter, and a seat in the measurement chamber that is adapted to support a sample lens. In one embodiment the imaging system may be a camera. In another embodiment the illumination source may be a collimated LED backlight. In one embodiment of the present invention the seat may by dome-shaped. In still another embodiment, the measurement chamber may be adapted to contain a medium. In a related embodiment, the medium may be saline.

In one embodiment the rotating fixture may include a seal and a bearing that are connected to the measurement chamber via the adapter. In another embodiment, a magnetic coupling may be used to connect the rotating fixture to the measurement chamber. In one embodiment of the current invention, a vacuum line may be used in fluid connection with the seat. In a related embodiment, the seat may be made of porous metal. In another embodiment of the present invention, the measurement chamber may have one or more windows.

The present invention may also include a method for measuring the thickness of an ophthalmic lens and may include the steps of taking one sets of images and subtracting the first image from the second image to obtain a thickness measurement, where taking one set of images comprises taking a first image of the measurement seat, placing a sample lens on the sample seat, and taking a second image if the sample lens on the measurement seat. In another embodiment, the method may include providing a measurement chamber and/or a rotating fixture. In still another embodiment, more than one set of images may be taken. In a related embodiment, the method may include transforming the images into numerical data, analyzing the data, and/or archiving the data.

The present invention may also include a system that includes the device and methods described herein.

The present invention may also include a method for determining the base curve of a lens. This method may include the steps of obtaining the front curve of a sample lens, measuring the thickness of the lens, and offsetting the front curve measurement by the thickness measurement. These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

The present invention is an apparatus and method to measure the thickness of a contact lens at any point on the lens. The measurement process is non-contact and/or non-destructive.

Figure 1:
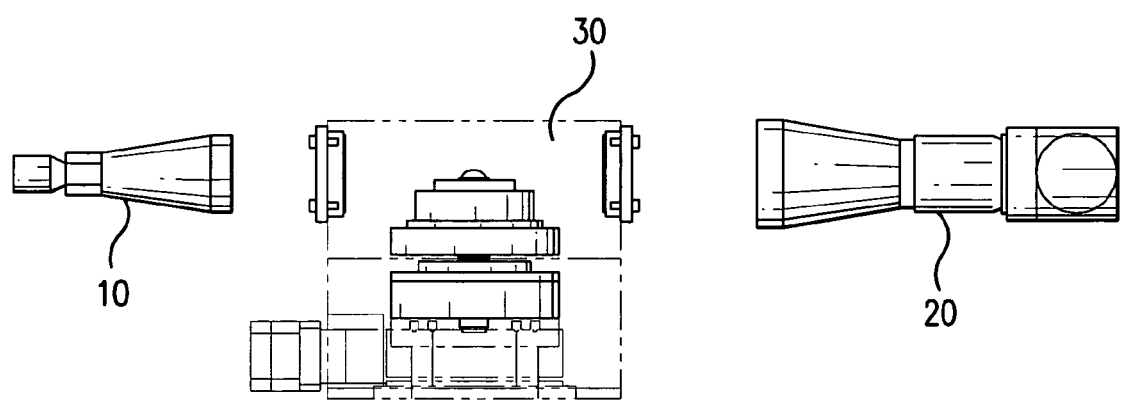
FIG. 1 is a cut-away side view of the present invention depicting the entire apparatus including an imaging means and illumination system.

FIG. 1 depicts an embodiment of the present invention including an illumination source 10, an imaging system 20, and a measurement chamber 30. Imaging system 20 is preferably a camera, but is not shown in this figure. In a preferred embodiment, the camera is a high-resolution digital camera. In one embodiment, the illumination source is a collimated backlight, such as an LED backlight. The LED backlight may be collimated through a telecentric lens to create parallel light rays in the system to prevent optical errors. In this embodiment, the sample lens is measured within measurement chamber 30. In this figure, the measurement chamber is shown in a wire-frame view in order to see the components inside the chamber.

Figure 2:
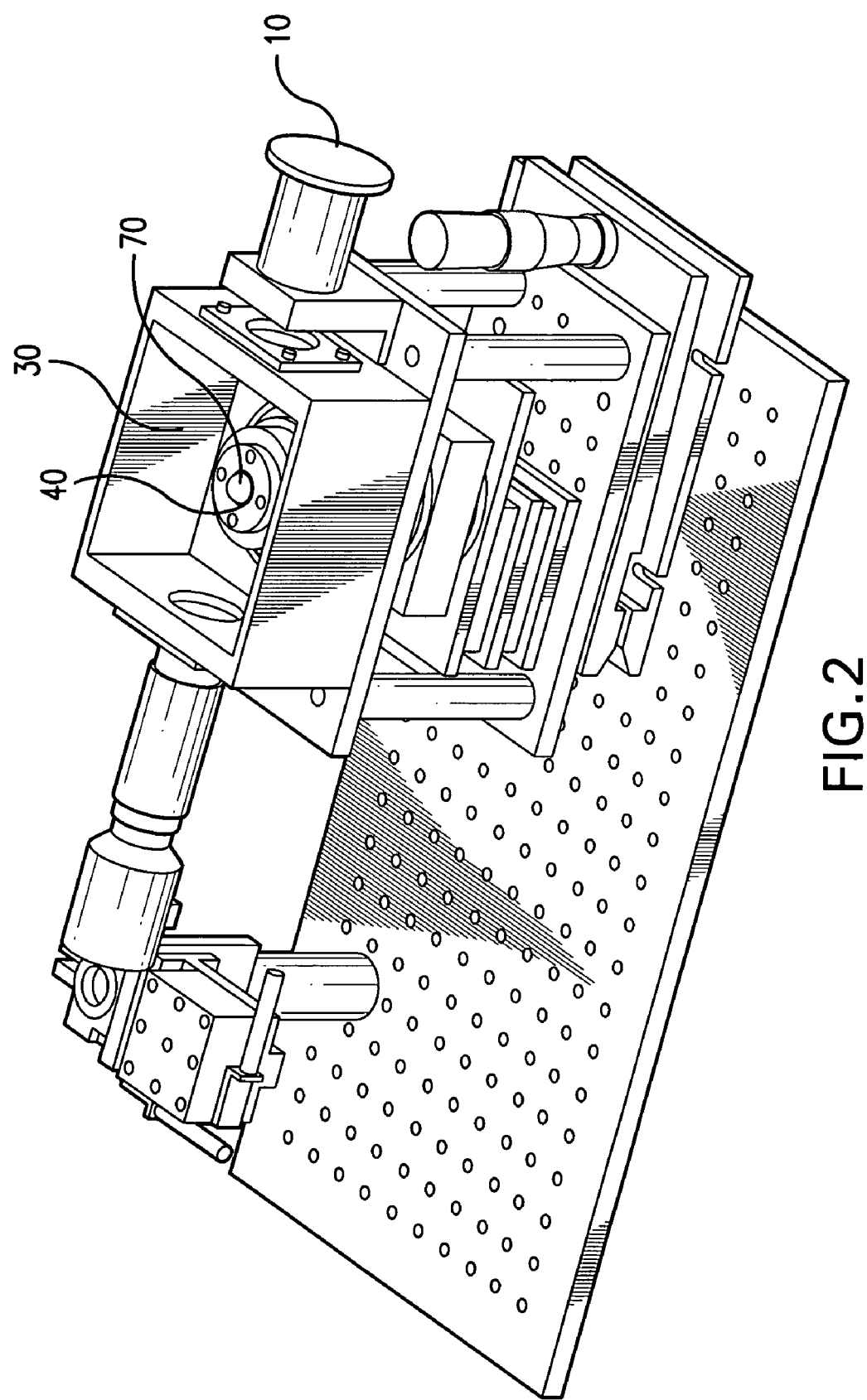
FIG. 2 is an overall system view that depicts the interior of the lens measurement chamber.

Referring to FIG. 2, the overall apparatus setup is shown. In this embodiment, the illumination source 10 is on the right and a support for imaging system 20 is on the left. In other embodiments, their relative positions may be altered to fit particular spaces. Additional optical components may also be used for other configurations to better reflect light or otherwise improve optical quality, etc.

Figure 3:
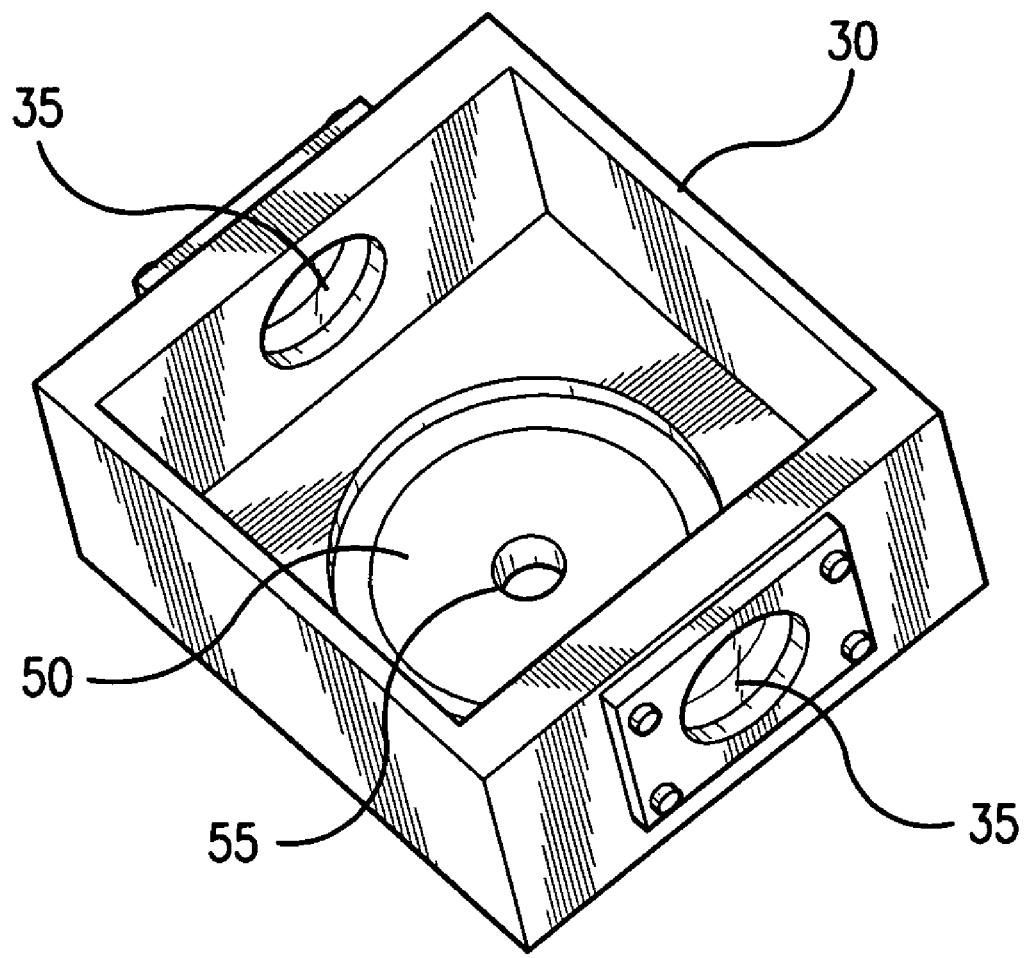
FIG. 3 is a close up view of the interior of the measurement chamber.

Measurement chamber 30 houses a fixture 40 that is adapted to hold and rotate the sample. Seat 70 is preferably affixed to fixture 40 and holds the sample lens in position to be measured. Measurement chamber 30 preferably has a mounting area 50 for a bearing as shown in FIG. 3. The mounting area 50 may also include an aperture 55 that provides space for an adapter and a vacuum line. Measurement chamber 30 is preferably adapted to contain a medium, such as saline, that allows the lens to retain water and hence, its shape. Measurement chamber 30 may be adapted to contain any type of medium, including air. In a preferred embodiment, measurement chamber 30 may be adapted to hold a temperature-controlled saline to ensure that the lens does not become dry during the measurement process. Measurement chamber 30 may also have windows or ports 35 that are used in conjunction with the optical components. These windows are preferably made of optical grade quartz or another material with similar optical properties. In a preferred embodiment, the lens conforms perfectly to the surface of seat 70 to best measure the thickness of the lens. Such a fit may be accomplished by using a vacuum or its equivalent to pull the lens down to the fixture. The vacuum/lens holding fixture is preferably rotatable, enabling the system to capture more than one "thickness slice" image.

Figure 4:
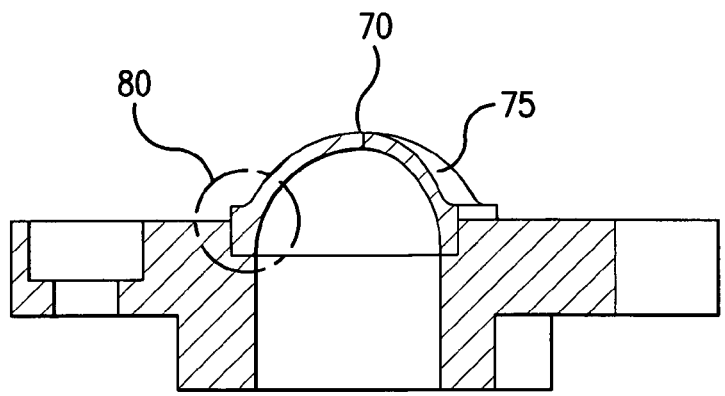
FIG. 4 is a cut away close up view of a seat used to support a lens during the measurement process.

The interface between the vacuum and the seat is shown in FIG. 4. FIG. 4 depicts two components, a vacuum plate 75 and a seat 70. The vacuum plate is preferably made from porous stainless steel, which may be manufactured using sintering techniques. The pore size of the stainless steel is preferably a filter grade ranging from about 2 to about 20 microns to allow proper fluid flow for the vacuum. The filter grade may affect the bubble point and or pump strength. The pump strength and pressure may be modified to accommodate various filter grades. Such a configuration should insure a pressure drop of approximately 5-15 psi relative to the measurement chamber to properly seat the lens. The outer cylindrical area of the seat 70 and vacuum plate 75 may be made from conventional stainless 316 steel. The bottom surface of seat 70 is preferably ground flat to prevent wobbling or vibration of the fixture during rotation. The seat 70 is preferably designed to minimize measurement errors. The geometry of the seat is of particular importance as it is preferably used as the reference for the thickness map; hence, it should be as smooth as possible to minimize noise. A step 80 may be created in the outer diameter of the seat to provide a reference to track the motions and dimensions of the fixture. The vertical edge is preferably visible to create a crisp line in profile view.

Figure 5:
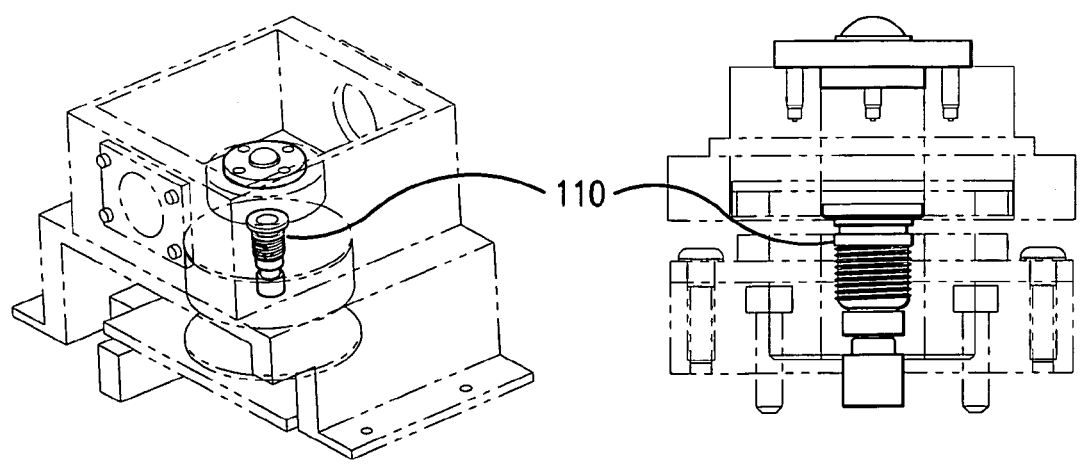
FIG. 5 depicts an adapter used in conjunction with the present invention.

In an embodiment in which a lens is measured while immersed in a liquid, the vacuum requires a seal in the measurement tank to prevent leakage of the fluid medium into components outside of the measurement chamber. A vacuum seal adapter 110, as shown in FIG. 5 may be used to attach and seal the vacuum channel between the measurement chamber and the lower portion of the fixture. In particular, the adapter may have an O-ring that operates as a seal to prevent fluid medium from contacting components outside of the measurement chamber. The adapter is preferably threaded to screw into a bore at the bottom of the measurement chamber. In an embodiment in which a liquid material is used in the measurement chamber, an O-ring may be used.

Figure 6:
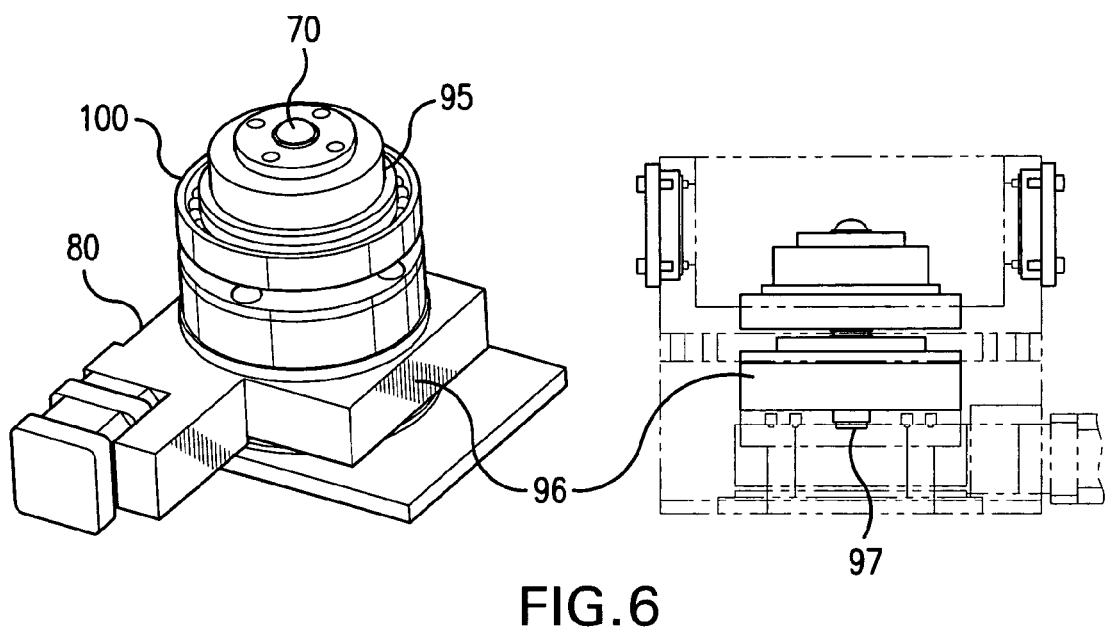
FIG. 6 depicts the fixture that holds and rotates the lens

The fixture that holds and rotates the lens is shown in detail in FIG. 6. The movement of rotary stage 80 rotates the measurement seat and hence, the lens. This stage is preferably not located in the measurement chamber to protect it from corrosion if a liquid medium is used. Magnetic coupling 90 has two portions, lower part 96, and upper part 95, and is used to rotate the fixture inside the measurement chamber 30. Lower portion 96 of the coupling is located outside measurement chamber 30. The vacuum fixture and upper magnetic coupling 95 are located inside the measurement chamber, which may be filled with saline. The lower magnetic coupling, rotary stage, and vacuum line 97 are located outside of the measurement chamber.

Bearing 100 has an inner and outerrace and is located inside the measurement chamber. The bearing is preferably used to support the upper magnetic coupling. The lower half of bearing 100 may be connected to a rotary stage that is located within the measurement chamber. Upper part 95 of magnetic coupling 90 is preferably fit into the inner race of bearing 100. The outer race of bearing 100 is preferably pressed into the bottom of the measurement chamber. In another embodiment, more than one bearing may be used to adequately preload the system. Bearings used in conjunction with the present invention are preferably precision bearings with outer and inner races made with a material that exhibits extreme resistance to corrosion. An exemplary material may be a steel alloy such as Cronidur 30. The tolerance grade of the bearing is preferably ABEC-9. The bearing may be an angular contact bearing. As the stage rotates, it turns the coupling, which rotates the lens. The rotational movement of the stage is preferably provided by an integrated motor. For example, the motor may be a servo, stepper, pneumatic or hydraulic motor. In one embodiment, the motor may be driven by a closed-loop motion controller which controls the movement based on the integrated encoder on the stage. The motion controller may also provide power to the motor. The motion controller is preferably connected to the PC through a serial port. A vacuum line preferably travels through the inner bore of magnetic coupling 90 and seals against the bottom of the measurement chamber. The vacuum line may be connected to an industrial diaphragm pump which can run dry and is preferably self-priming. Other pumps with equivalent properties may also be used.

In one embodiment, a separate fluid circulation system may be provided to control the temperature of the fluid medium. In this embodiment, the fluid medium may be circulated from the measurement chamber through a fluid heating or cooling system. Fluid heaters with integrated pumps and closed-loop microchip control are commercially available and known in the art. The medium is preferably returned to the measurement chamber after being heated or cooled. The intake and outtake ports for the temperature control preferably use tubing inserted through a cover on the measurement chamber.

All components inside the measurement chamber are preferably made of 316L stainless steel or an equivalent material. In a preferred embodiment, the materials are passivated to prevent corrosion. For example, the components may be bathed in nitric acid for about 1 to about 2 hours.

In a method of the present invention, at least one, preferably two images are taken: one image of seat 70 without a sample lens, and a second image of the sample lens on seat 70. By taking a picture of the seat without the sample lens, the measurement can be calibrated. The second image produces a profile with the sample lens and seat appearing dark and a sharply defined edge. If the image of the seat without the sample lens is subtracted from the image of the seat with the sample lens, the result will be an image of the thickness of the sample lens. Using image analysis software, the thickness of the sample lens may then be calculated. The thickness is preferably calculated normal to the base curve of the thickness image, which conforms to the profile of the vacuum seat. The base curve may be detected by edge detection functions that are well known in the art. A typical example is a thresholding function that examines a line of pixels for a large change in pixel intensity. Once a base curve point is located, a search line may be created normal to the base curve in to detect the front curve using the same edge detection function. The distances between these two points defines the thickness at that point relative to the base curve.

Figure 7:
FIG. 7 depicts a profile of a lens as a result of image subtraction.

FIG. 7 depicts the results of the image subtraction. The thickness of the sample lens is clearly visible. In a preferred embodiment, only half of the lens is analyzed at a time to increase the resolution in the image. In another embodiment, the thickness of the lens can be determined by finding the center of the fixture and subtracting the radius of the fixture from the outer profile of the lens.

Figure 8:
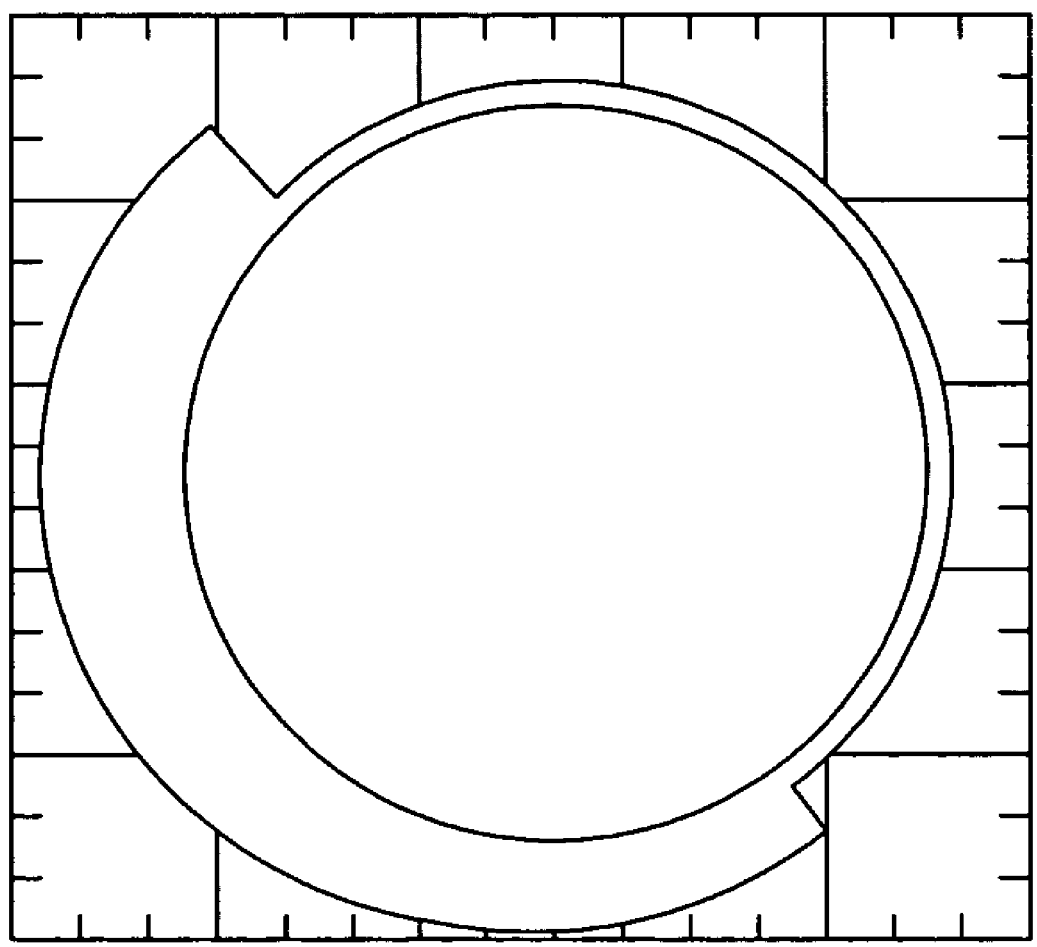
FIG. 8 depicts a thickness plot that may be generated by the present invention.
Figure 9:
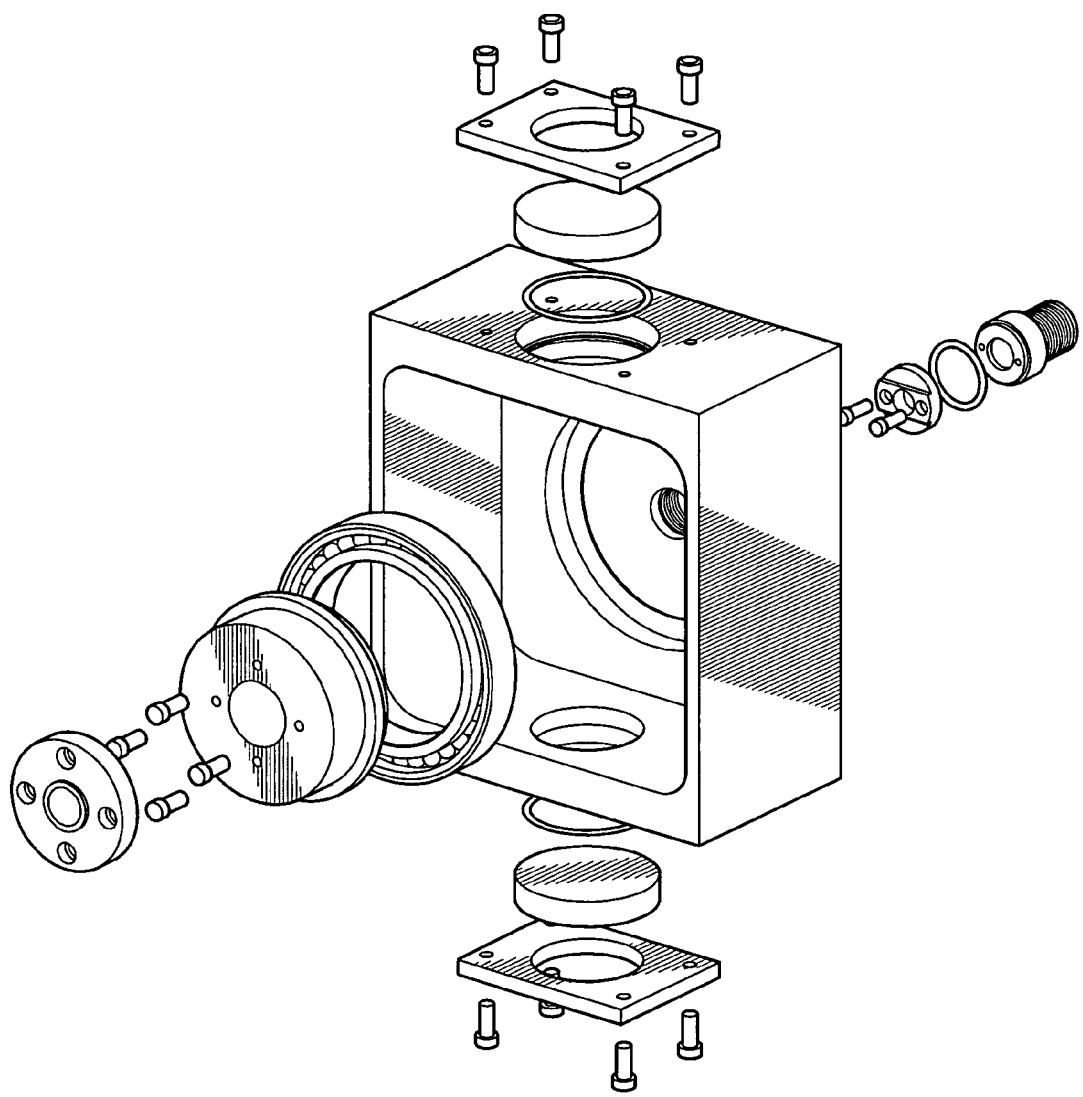
FIG. 9 depicts an exploded assembly view of one embodiment of the present invention.

The data from each slice can be combined into a thickness map as shown in FIG. 8. Referring to FIG. 8, a semi-circular area towards the bottom-right of the map shows the areas of greater thickness. Area 300 represents the highest or thickest areas on the lens (around 350 microns) and area 310 depicts lower areas (around 85 microns). Area 320 is nearly zero and may be negligible.

The non-contact measurement of the present invention ensures that the lens is not damaged or destroyed. Additionally, image processing according to the present invention is rapid. For example, in one embodiment, about 6000 thickness points can be calculated to sub-micron accuracy in less than about 0.25 seconds. Sample preparation is preferably simplified and all measurements are digital, removing operator error and operator to operator inconsistencies. Multiple thickness slices may be measured according to the present invention. In one embodiment, the number of slices to be obtained is set by the user and is only limited by the resolution of the equipment. Once a sufficient number of slices is taken, the thickness can be represented as surface. This surface can be interpolated to find the thickness at any point on the contact lens. Interpolation programs and code are known in the art. In summary, the measurement time will be dramatically reduced while increasing the amount of data gathered.

The present invention may be used to generate data for a single plane through the lens, or may represent an entire thickness surface. The present invention is preferably adapted to communicate with other applications. After the data is captured, it is preferably stored to a database, exported to an operating or CAD system for further analysis and comparison to design models. For example, the results may be compiled and exporting to database, word processing, or spreadsheet systems such as Microsoft Excel™, Access™ Word™ for archival, retrieval or analysis. The data may also be used for design verification. For example, thickness may be created from CAD models. The design map and the measured map may be compared to determine deviation from design. This type of data analysis can be automated. Additionally, the present invention may be integrated into a barcode-based metrology.

Figure 10:
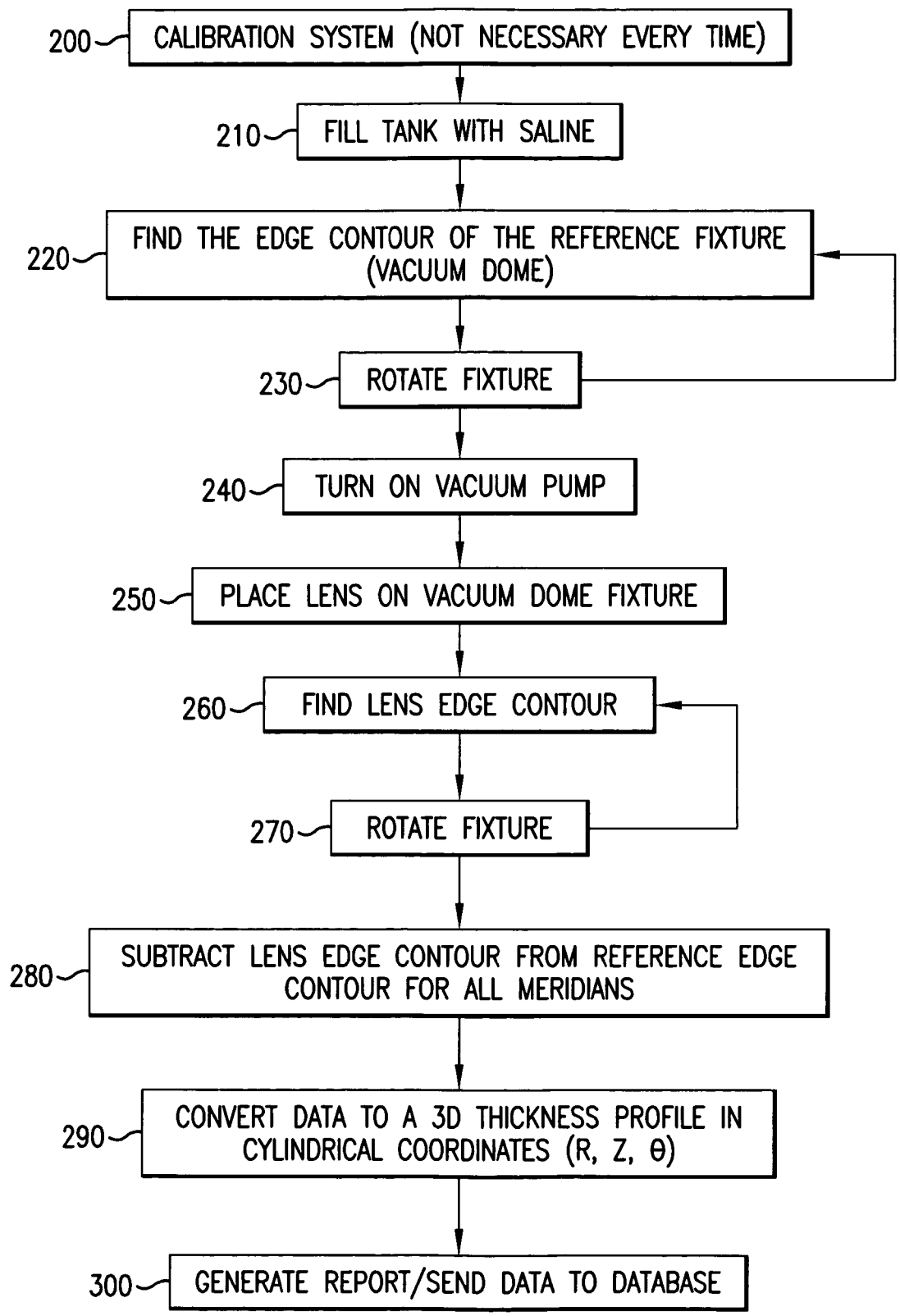
FIG. 10 depicts a flowchart diagram of the processes used in the methods of the present invention.

The method of the present invention is outlined in the flowchart shown in FIG. 10. The steps shown in FIG. 10 may be performed in any logical order and are not meant to be limiting. In step 200, the system is preferably calibrated. In step 210 the measurement chamber is preferably filled with a medium, such as saline for example. Step 220 involves finding the edge contour of the reference frame. This step may include taking an image of the edge (i.e. the measurement seat) or using an edge-finding function to find a number of discrete points on the edge. In an embodiment in which an edge-finding feature is used, a number of discrete points are preferably saved in an array to represent the edge. In step 230 the fixture is preferably rotated to capture full images of the measurement seat. The process of finding the edge contour and rotating the fixture may be repeated several times.

Next, in step 240, the vacuum pump is preferably turned on. Then, in step 250, the lens may be placed on the measurement seat. Step 260, similar to step 220 involves finding the edge contour of the reference frame. This step may include taking an image of the edge (i.e. the measurement seat) or using an edge-finding function to find a number of discrete points on the edge. In an embodiment in which an edge-finding feature is used, a number of discrete points are preferably saved in an array to represent the edge. In step 270, similar to step 230, the fixture is preferably rotated to capture full images of the measurement seat with the lens on it. The process of finding the edge contour and rotating the fixture may be repeated several times.

In step 280, the lens edge contour is preferably subtracted from the reference edge contour for all meridians. This subtraction may be accomplished by either subtracting contours/images or by subtracting the edge point arrays. In an embodiment in which images are subtracted, then a software program preferably uses an edge finder to locate the top and bottom surfaces. The linear distance between these points is the resultant desired thickness measurement. In an embodiment in which arrays are subtracted, the difference at each point is the resultant desired thickness measurement.

The data taken for the subtraction step is then preferably converted to a 3D thickness profile in cylindrical coordinates in step 290. Lastly, in step 300, a report containing the thickness profile and/or measurement may be generated and/or sent to a database.

Practically, this means that lenses can be measured for defects before being tested on eye to be sure the correct design is being studied. Manufacturing consistency can be verified at multiple points, not just with a center thickness. Problems detected in a clinical trial can be more easily isolated and classified.

The thickness map created by this device can be combined with a front surface profile of a contact lens to develop a 3D model of the actual geometry. This will allow non-contact/non-destructive measurement of the base curve.

The present invention may also be combined with the invention entitled "Method and device for determining the thickness of a lens" filed concurrently with the present invention, also by Jordan Hall. This application is expressly incorporated by reference as if fully set forth herein. In this embodiment, the thickness map, as determined by the methods listed above, may be combined with a front surface profile of a contact lens to generate a three-dimensional model of the lens, including the base curve surface geometry. Once the measured thickness of the lens is determined through methods disclosed herein, it may be added to the front surface geometry as measured by the U.S. patent application referenced above, to create the base curve surface, i.e., offsetting the front curve by the thickness to get the base curve.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

I claim:

1. A device for presenting an ophthalmic lens for inspection comprising:
   an illumination source in optical connection with;
   an imaging system adapted to measure the distance of the lens;
   a measurement chamber in optical connection with said illumination source and said imaging system;
   a rotating fixture connected to said measurement chamber via an adapter; and
   a seat in said measurement chamber adapted to support a sample lens, wherein said seat is rotated by the rotating fixture, and
   wherein said device is adapted to measure the thickness of said ophthalmic lens.

2. The device of claim 1, wherein said imaging system further comprises a camera.

3. The device of claim 1, wherein said imaging system further comprises a digital image sensor.

4. The device of claim 3 wherein said digital image sensor is selected from the group consisting of a CCD and a CMOS based imaging technology.

5. The device of claim 1, wherein said imaging system further comprises a telecentric lens.

6. The device of claim 1, wherein said imaging system further comprises a non-telecentric lens.

7. The imaging system of claim 6 where the images have been calibrated to reduce optical errors selected from the group consisting of parallax, distortion, and magnification errors.

8. The device of claim 1, wherein said illumination source is selected from the group consisting of a collimated LED backlight, visible laser with a beam expander, laser diode, and a LED array.

9. The device of claim 1, wherein said seat is dome-shaped.

10. The device of claim 1, wherein said seat has a surface selected from the group consisting of multiple radii, aspheric surfaces, and an arbitrary spline-based surface.

11. The device of claim 1, wherein said measurement chamber is adapted to contain a medium.

12. The device of claim 11, wherein said medium is saline.

13. The device of claim 1, wherein said rotating fixture further comprises a seal and a bearing that are connected to said measurement chamber via said adapter.

14. The device of claim 1, further comprising a magnetic coupling that connects said rotating fixture to said measurement chamber.

15. The device of claim 1, further comprising a vacuum line in fluid connection with said seat.

16. The device of claim 1, wherein said measurement chamber has at least one window.

17. The device of claim 1, wherein said seat is made of porous metal.

18. The device of claim 1, wherein said seat is made of a plastic or metal material with a series of drilled holes for creating a vacuum.

19. A system for ophthalmic lens inspection comprising:
    an illumination source in optical connection with an imaging system;
    said imaging system adapted to measure the distance to said lens;
    a measurement chamber in optical connection with said illumination source and said imaging system;
    a rotating fixture connected to said measurement chamber via an adapter; and
    a seat in said measurement chamber adapted to support a sample lens, wherein illumination source illuminates said sample lens to allow said imaging system to locate said lens and measure the thickness of said lens.

20. A method for measuring the thickness of an ophthalmic lens comprising:
    providing an illumination source, imaging system comprising a digital image sensor and a measurement seat;
    taking one set of images comprising the steps of:
    taking a first image of said measurement seat;
    placing a sample lens on said measurement seat; and
    taking a second image of said lens on said measurement seat;
    transforming said first and second images into first and second numerical data sets via said digital image sensor; and then
    subtracting said second numerical data set from said first numerical data set to obtain a thickness measurement.

21. The method of claim 20, further comprising providing a measurement chamber.

22. The method of claim 20, further comprising providing a rotating fixture.

23. The method of claim 20, further comprising taking more than one set of images.

24. The method of claim 20, further comprising transforming said images into numerical data.

25. The method of claim 24, further comprising analyzing said data.

26. The method of claim 24, further comprising archiving said data.

27. A method for measuring the thickness of an ophthalmic lens comprising:
    providing an illumination source, imaging system comprising a digital image sensor, a measurement chamber and a measurement seat;
    calibrating the illumination source, imaging system, measurement chamber, and measurement seat;
    filling the measurement chamber with a medium;
    taking one set of images comprising the steps of:
    finding the edge contour of the measurement seat;
    taking a first image of said measurement seat;
    activating a vacuum pump;
    placing a sample lens on said measurement seat;
    finding the edge contour of said sample lens; and
    taking a second image of said lens on said measurement seat;

transforming said first and second images into first and second numerical data sets via said digital image sensor;

subtracting said second numerical data set from said first numerical data set to obtain a thickness measurement; and then converting said thickness measurement to a three-dimensional thickness profile.

28. The method of claim 27 further comprising:

obtaining the front curve geometry of a sample lens, and offsetting said front curve measurement by said thickness measurement to obtain the base curve surface.

* * * * *